United States Patent
Suzuki et al.

(10) Patent No.: US 12,301,095 B2
(45) Date of Patent: May 13, 2025

(54) SEMICONDUCTOR DEVICE

(71) Applicant: Mitsubishi Electric Corporation, Tokyo (JP)

(72) Inventors: Shin Suzuki, Tokyo (JP); Toshiya Tadakuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 18/069,926

(22) Filed: Dec. 21, 2022

(65) Prior Publication Data
US 2023/0308008 A1    Sep. 28, 2023

(30) Foreign Application Priority Data
Mar. 23, 2022    (JP) .................................. 2022-046690

(51) Int. Cl.
*H02M 7/5387*    (2007.01)
*H02M 1/08*    (2006.01)

(52) U.S. Cl.
CPC ........... *H02M 1/08* (2013.01); *H02M 7/5387* (2013.01)

(58) Field of Classification Search
CPC .............................. H02M 1/08; H02M 7/2387
See application file for complete search history.

(56) References Cited

U.S. PATENT DOCUMENTS

| | | | |
|---|---|---|---|
| 5,686,859 A | 11/1997 | Majumdar et al. | |
| 2005/0168161 A1* | 8/2005 | Chiou | H05B 41/2855 315/225 |
| 2008/0169792 A1* | 7/2008 | Orr | H02M 3/155 323/222 |
| 2018/0309358 A1* | 10/2018 | Hsiao | H02M 1/34 |

FOREIGN PATENT DOCUMENTS

JP    H08-308253 A    11/1996

OTHER PUBLICATIONS

An Office Action; "Notice of Reasons for Refusal," mailed by the Japanese Patent Office on Feb. 18, 2025, which corresponds to Japanese Patent Application No. 2022-046690 and is related to U.S. Appl. No. 18/069,926; with English language translation.

* cited by examiner

*Primary Examiner* — Gary L Laxton
(74) *Attorney, Agent, or Firm* — Studebaker Brackett PLLC

(57) ABSTRACT

A power module includes at least one semiconductor switching element and at least one output terminal. At the output terminal, a voltage changes as a result of switching of connection relation with a power supply line in accordance with on and off of the semiconductor switching element. A self-generating power supply circuit includes an input node connected to the output terminal with a first capacitor being interposed, a diode connected in a predetermined connection direction between the input node and an output node, a second capacitor connected between the output node and a reference node, and a resistor connected between the input node and a ground line. The second capacitor holds a voltage across the reference node and the output node, in polarity in accordance with the connection direction of the diode.

17 Claims, 3 Drawing Sheets

SEMICONDUCTOR DEVICE

BACKGROUND OF THE INVENTION

Field of the Invention

The present disclosure relates to a semiconductor device.

Description of the Background Art

For a circuit group for on and off control of a power semiconductor element such as a drive circuit (a gate driver or the like), a control power supply voltage lower than a main circuit voltage should be prepared.

For example, Japanese Patent Laying-Open No. 8-308253 describes configuring a self-generating power supply circuit for a drive circuit by connecting two capacitors in series with a diode being interposed between main electrodes (between a collector and an emitter) of a semiconductor element controlled by the drive circuit to turn on and off.

The power supply circuit described in Japanese Patent Laying-Open No. 8-308253 generates a control power supply voltage for the drive circuit by dividing a voltage across the main electrodes by capacitive coupling of the two capacitors during an off period of the semiconductor element. Thus, without a transformer disadvantageous in terms of reduction in size of a system and generation of noise, a self-generating power supply circuit configured with simplified circuit elements can supply the control power supply voltage.

SUMMARY OF THE INVENTION

The power supply circuit in Japanese Patent Laying-Open No. 8-308253, however, generates power supply by dividing a voltage across the main electrodes during the off period of the semiconductor element, and hence it is difficult to generate a negative voltage. Therefore, the power supply circuit in Japanese Patent Laying-Open No. 8-308253 configured with simplified circuit elements is not applicable to a circuit that uses a negative voltage as the power supply in the circuit group including the drive circuit.

The present disclosure was made to solve such a problem, and an object of the present disclosure is to provide a semiconductor device including a self-generating power supply circuit which is simplified in circuit configuration and is widely applicable.

In one aspect of the present disclosure, a semiconductor device is provided. The semiconductor device includes a power module in which at least one semiconductor switching element is contained and a self-generating power supply circuit connected to the power module. The power module includes at least one output terminal. At the output terminal, a voltage changes as a result of switching of connection relation with a power supply line for supply of a direct-current (DC) voltage, in accordance with on and off of the semiconductor switching element. The self-generating power supply circuit includes an input node, a diode, a second capacitor, and a resistor. The input node is connected to the output terminal or the power supply line with a first capacitor being interposed. The diode is connected in a predetermined connection direction between an output node and the input node. The second capacitor is connected between a reference node and the output node. The resistor is connected between the input node and a ground line. The second capacitor holds a voltage across the reference node and the output node, in polarity in accordance with the connection direction of the diode.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
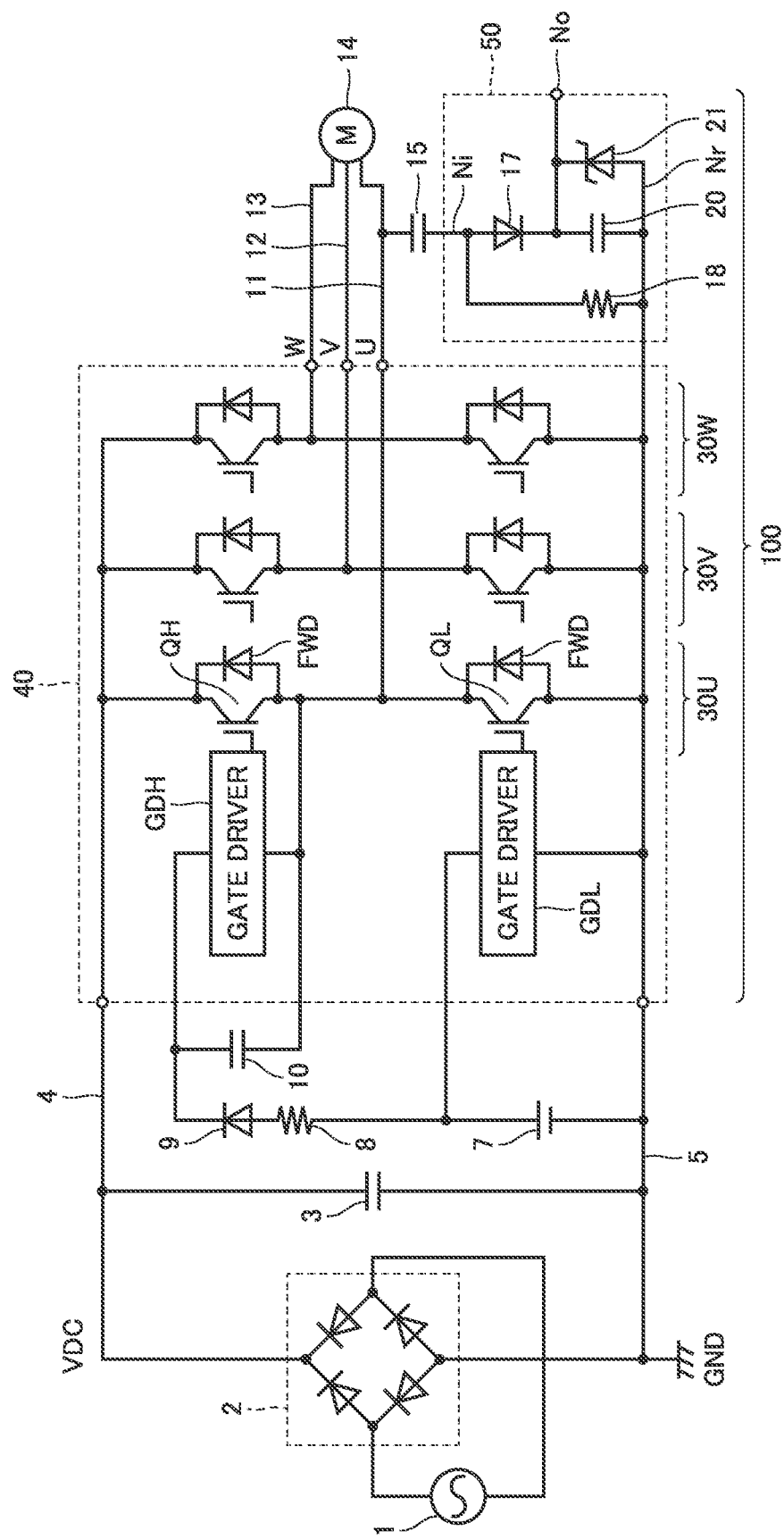
FIG. 1 is a circuit diagram illustrating an exemplary configuration of a semiconductor device according to a first embodiment.

An embodiment of the present disclosure will be described in detail below with reference to the drawings. The same or corresponding elements in the drawings below have the same reference characters allotted and description thereof will not be repeated in principle.

First Embodiment

FIG. 1 is a circuit diagram illustrating an exemplary configuration of a semiconductor device according to a first embodiment.

Referring to FIG. 1, a semiconductor device 100 according to the first embodiment includes a power module 40 and a self-generating power supply circuit 50. Power module 40 includes a semiconductor switching element QH on a high side and a semiconductor switching element QL on a low side connected in series between a power supply line 4 and a ground line 5. A freewheeling diode FWD is connected in anti-parallel to each of semiconductor switching element QH and semiconductor switching element QL.

In an example in FIG. 1, power module 40 is a three-phase inverter including a U-phase circuit 30U, a V-phase circuit 30V, and a W-phase circuit 30W connected in parallel between power supply line 4 and ground line 5. Each of U-phase circuit 30U, V-phase circuit 30V, and W-phase circuit 30W includes semiconductor switching element QH on the high side and semiconductor switching element QL on the low side. In each of U-phase circuit 30U, V-phase circuit 30V, and W-phase circuit 30W, a point of connection between semiconductor switching element QH and semiconductor switching element QL is connected to an output terminal of that phase (U, V, or W).

A silicon insulated gate bipolar transistor (Si-IGBT) is illustrated in FIG. 1 as each of semiconductor switching elements QH and QL. Instead of the IGBT, however, a metal oxide semiconductor field effect transistor (MOSFET) can also be employed, and any semiconductor element that can be turned on and off is applicable. Semiconductor switching elements QH and QL can also be configured with a wide band gap (WBG) device represented by a silicon carbide (SiC)-MOSFET.

Semiconductor switching element QH is turned on and off by a gate driver GDH on the high side in accordance with a not-shown control signal. Similarly, semiconductor switching element QL is turned on and off by a gate driver GDL on the low side in accordance with a not-shown control signal. Though not shown, gate driver GDH on the high side and gate driver GDL on the low side are arranged also for semiconductor switching elements QH and QL of each of V-phase circuit 30V and W-phase circuit 30W, and six semiconductor switching elements in FIG. 1 are separately controlled to turn on and off.

On a power supply side of power module 40, an output voltage from an alternating-current (AC) power supply 1 is rectified by a diode bridge 2 and applied to a smoothing capacitor 3 connected between power supply line 4 and ground line 5. Thus, with ground line 5 for supply of a ground voltage CND being defined as a reference, a DC voltage VDC corresponding to a main circuit voltage is supplied through power supply line 4.

A control power supply 7 for driving gate drivers GDL and GDH included in power module 40 may be arranged. In this case, an output voltage from control power supply 7 is supplied to gate driver GDL on the low side, whereas gate driver GDH on the high side is connected to control power supply 7 with a limiting resistor 8 and a bootstrap diode 9 being interposed. Furthermore, a bootstrap capacitor 10 is connected between the power supply line of gate driver GDH and a negative electrode (an emitter in the IGBT and a source in the MOSFET) of semiconductor switching element QH on the high side.

With a "bootstrap circuit" configured with limiting resistor 8, bootstrap diode 9, and bootstrap capacitor 10, gate drive for turning on semiconductor switching element QH on the high side can be achieved with the use of charges stored in bootstrap capacitor 10 during an on period of semiconductor switching element QL on the low side. Though FIG. 1 shows limiting resistor 8 and bootstrap diode 9 as elements externally attached to power module 40, they may be contained in power module 40. Though FIG. 1 illustrates a circuit configuration including the bootstrap circuit described above for reduction in number of controlled power supplies, arrangement of an additional control power supply for gate driver GDH on the high side separately from control power supply 7 in FIG. 1 does not give rise to a problem in operations of the circuit.

Though not shown in FIG. 1, peripheral elements similar to those in U-phase circuit 30U for semiconductor switching element QH on the high side and semiconductor switching element QL on the low side are arranged also in V-phase circuit 30V and W-phase circuit 30W.

Output terminals (U, V, and W) of power module 40 are connected to an inductive load 14 represented by a three-phase motor through lines 11 to 13. Self-generating power supply circuit 50 is connected to the output terminal of one phase (the U-phase in the example in FIG. 1) among the output terminals of three phases with a capacitor 15 being interposed. Capacitor 15 is connected between power module 40 described above and an input node Ni of self-generating power supply circuit 50. Capacitor 15 corresponds to one embodiment of the "first capacitor."

Self-generating power supply circuit 50 includes a diode 17 connected between input node Ni and an output node No, a resistor 18 connected between input node Ni and ground line 5, and a capacitor 20 connected between output node No and a reference node Nr. Furthermore, a Zener diode 21 to stabilize a voltage of output node No, that is, an output voltage from self-generating power supply circuit 50, may be arranged between output node No and reference node Nr.

In the first embodiment, reference node Mr is connected to ground line 5. Capacitor 20 corresponds to one embodiment of the "second capacitor."

In the example in FIG. 1, diode 17 is arranged in such a connection direction (a first connection direction) that diode 17 has an anode connected to input node Ni and a cathode connected to output node No. Zener diode 21 is arranged in such a connection direction that Zener diode 21 has an anode grounded and a cathode connected to output node No.

When power module 40 operates as an inverter in semiconductor device 100 in FIG. 1, six contained semiconductor switching elements are controlled to turn on and off by the gate drivers (GDH and GDL) of power module 40. Semiconductor device 100 thus converts a DC voltage of power supply line 4 to an AC voltage (DC/AC power conversion) to drive inductive load 14. Though not shown in FIG. 1, timing of turn-on and -off of corresponding semiconductor switching elements QH and QL by gate drivers GDH and GDL of each phase is instructed in a control signal (not shown) transmitted from a control unit of a not-shown system such as a microcomputer to power module 40.

In DC/AC power conversion described above, for example, timing of turn-on and -off of semiconductor switching elements QH and QL is determined by pulse width modulation (PWM) control based on comparison between carrier waves having a predetermined carrier frequency and an AC command value. The carrier frequency is normally a high frequency approximately from several kilohertz (kHz) to more than ten kilohertz (kHz).

Consequently, voltages at the output terminals of three phases and lines 11 to 13 through which the output terminals and inductive load 14 are connected to each other change in such a manner as swinging between DC voltage VDC of power supply line 4 and ground voltage GND of ground line 5 in response to on and off of the semiconductor switching elements in accordance with the carrier frequency. Though variation in voltage that occurs in lines 11 to 13 at the time of such switching (on and off of the semiconductor switching elements) is determined by characteristics of the semiconductor switching elements (QH and QL) contained in power module 40 and inductive load 14, high-speed variation in voltage (dV/dt) approximately by several kilovolts per microsecond (kV/μs) occurs, for example, each time switching is made.

Variation in voltage (dV/dt) described above that occurs in line 11 is transmitted to input node Ni of self-generating power supply circuit 50 owing to coupling by capacitor 15. Capacitor 15 is arranged to electrically isolate line 11 which handles a high voltage and self-generating power supply circuit 50 which handles a low voltage from each other. Therefore, a capacitance value of capacitor 15 may be set approximately to several nanofarads (nf) so long as insulation is ensured.

As semiconductor switching element QH on the high side is turned on, in lines 11 to 13 of respective phases, the voltage increases from ground voltage GND to DC voltage VDC, and therefore variation in voltage in a positive direction ((dv/dt)>0) is inputted to self-generating power supply circuit 50 (input node Ni).

In contrast, as semiconductor switching element QH on the high side is turned off, the voltage of each of lines 11 to 13 lowers from DC voltage VDC to ground voltage GND, and therefore variation in voltage in a negative direction ((dv/dt)<0) is inputted to self-generating power supply circuit 50 (input node Ni).

Diode 17 allows passage of one of variation in voltage in the positive direction and variation in voltage in the negative direction depending on the connection direction, and allows charging of capacitor 20 with a quantity of charges determined by |dV/dt|. A quantity of charges Q provided to capacitor 20 is expressed as $dQ/dt=C\times|dv/dt|$ per unit time, where C represents a capacitance value of capacitor 20.

In the connection direction of diode 17 in the example in FIG. 1, capacitor 20 is charged by variation in voltage in the positive direction ((dv/dt)>0), whereas variation in voltage in the negative direction ((dv/dt)<0) is not transmitted to the capacitor. Consequently, even when variation in voltage in the negative direction ((dv/dt)<0) is inputted, diode 17 blocks discharging of capacitor 20. Consequently, at output node No connected to capacitor 20, a positive voltage is generated as the output voltage from self-generating power supply circuit 50.

By arranging resistor 18, a discharge path for capacitor 15 at the time when variation in voltage in polarity that does not pass through diode 17 (variation in voltage in the negative direction in the example in FIG. 1) occurs at input node Ni can be ensured. Consequently, charging to capacitor 20 can be stabilized. A resistance value of resistor 18 can be determined so as not to excessively restrict a charging and discharging current of capacitor 15, and it can be set, for example, to several ohms (a).

Zener diode 21 is arranged in such a connection direction that Zener diode 21 has the cathode connected to output node No for stabilizing the voltage at output node No and for preventing an overvoltage.

The connection direction of diode 17 can be set to a direction opposite to the direction in the example in FIG. 1, in which the diode has the anode connected to output node No and the cathode connected to input node Ni (a second connection direction). In this case, diode 17 allows transmission of variation in voltage in the negative direction ((dv/dt<0) to capacitor 20 whereas it does not allow transmission of variation in voltage in the positive direction ((dv/dt>0) to capacitor 20. Therefore, capacitor 20 is charged by variation in voltage in the negative direction ((dv/dt<0), whereas discharging of capacitor 20 is blocked by diode 17 even when variation in voltage in the positive direction ((dv/dt>0) is inputted. Consequently, a negative voltage is generated as the output voltage from self-generating power supply circuit 50 at output node No connected to capacitor 20.

When diode 17 is connected in the second connection direction described above, Zener diode 21 is also arranged in the connection direction opposite to the direction in FIG. 1. Specifically, Zener diode 21 is arranged in such a connection direction that it has the anode connected to output node No and the cathode connected to ground line 5.

Thus, in the semiconductor device according to the present first embodiment, self-generating power supply circuit 50 with a simplified configuration including diode 17, resistor 18, and capacitor 20 can generate at the output node, a low output voltage from the output voltage (high voltage) from power module 40. In particular, self-generating power supply circuit 50 in the present embodiment can output any of the positive voltage and the negative voltage depending on the connection direction of diode 17, and can supply power to a wider variety of targets, that is, applicability thereof can be wider. An absolute value of the output voltage can also be adjusted as appropriate based on design of each constant, for example, within a range approximately from several volts (V) to more than ten volts (V).

The output voltage from self-generating power supply circuit 50 can be used, for example, as a power supply voltage of any circuit represented by not-shown other circuits within power module 40. For example, the output voltage can effectively be used for a function to operate with weak electric power, such as an Fo signal for notification of sensing of abnormality, for example, with a function performed in a dual inline package intelligent power module (DIPIPM™). In this case, by power supply for the circuit involved with the Fo signal from self-generating power supply circuit 50, preparation of an extra transformer for a control power supply for the Fo signal is not required, which can contribute to reduction in size and cost of a system.

When the semiconductor switching element contained in power module 40 is configured with a WBG device as well, the output voltage can be generated by self-generating power supply circuit 50 identical in configuration. The WBG device is capable of switching faster than an Si device (for example, a general Si-IGBT element), and hence an absolute value of change in voltage (dV/dt) is larger. Since a quantity of charges for charging of capacitor 20 is thus readily ensured, self-generating power supply circuit 50 can more efficiently operate.

In the first embodiment, self-generating power supply circuit 50 can be provided in correspondence with an output terminal of any phase of power module 40, or self-generating power supply circuit 50 can also be provided for each of a plurality of phases.

Second Embodiment

Figure 2:
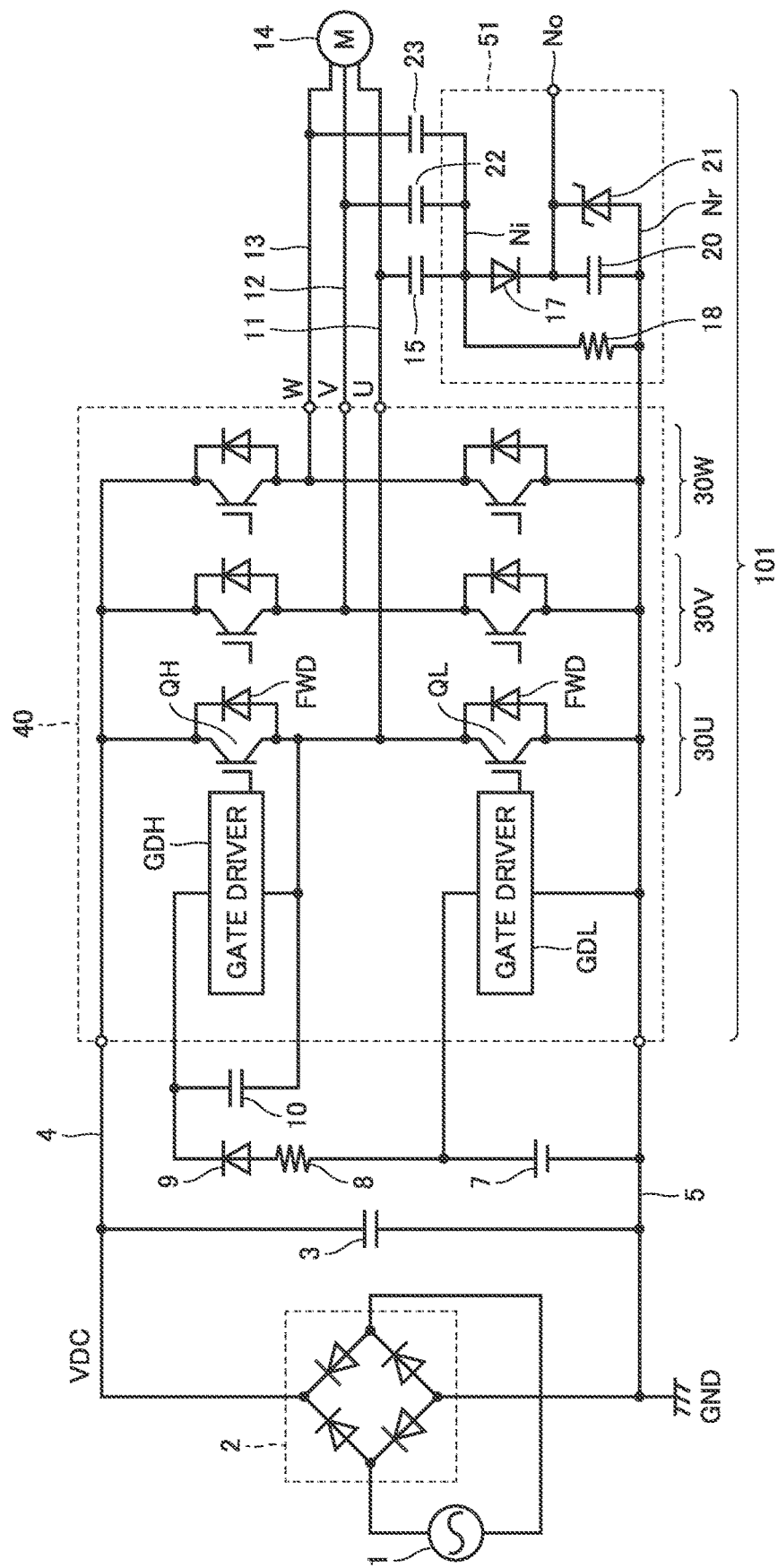
FIG. 2 is a circuit diagram illustrating an exemplary configuration of a semiconductor device according to a second embodiment.

FIG. 2 is a circuit diagram illustrating an exemplary configuration of a semiconductor device according to a second embodiment.

Referring to FIG. 2, a semiconductor device 101 according to the second embodiment includes power module 40 as in FIG. 1 and a self-generating power supply circuit 51.

Self-generating power supply circuit 51 is similar in circuit configuration to self-generating power supply circuit 50 shown in FIG. 1, whereas it is different from self-generating power supply circuit 50 in being connected to all of lines 11 to 13 with capacitors 15, 22, and 23 being interposed. Reference node Nr is connected to ground line 5 also in self-generating power supply circuit 51. In the second embodiment, each of capacitors 15, 22, and 23 corresponds to one embodiment of the "first capacitor."

Therefore, in self-generating power supply circuit 51, all changes in voltage (dV/dt) that occur in lines 11 to 13 rather than only in line 11 are transmitted to input node Ni. In other words, all of change in voltage from VDC to GND ((dV/dt<0) and change in voltage from GND to VDC ((dV/dt)>0) that occur at the output terminals of respective three phases (U, V, and W) of power module 40 are transmitted to input node Ni.

Self-generating power supply circuit 51 operates similarly to self-generating power supply circuit 50 described above. In other words, in the connection direction of diode 17 shown in FIG. 2, a positive voltage resulting from charging of capacitor 20 with a quantity of charges with change in voltage in the positive direction in lines 11 to 13 is generated at output node No.

When the connection direction of diode 17 is reversed from the direction in FIG. 2, a negative voltage resulting from charging of capacitor 20 with a quantity of charges with change in voltage in the negative direction in lines 11 to 13 is generated at output node No.

Since charges for charging capacitor 20 are secured with the use of change in voltage (dV/dt) for three phases in self-generating power supply circuit 51, capacitor 20 can be charged fast. Therefore, electric power that can be supplied as power supply also increases. Therefore, as compared with the first embodiment, a power supply voltage can be supplied to a circuit high in power consumption, and applicability as the power supply circuit can be enhanced. For example, in mounting self-generating power supply circuit 51 on the DIPIPM™ described above, use in a circuit high in power consumption to some extent such as a gate driver configured with an embedded integrated circuit (IC) is also permitted.

Third Embodiment

Figure 3:
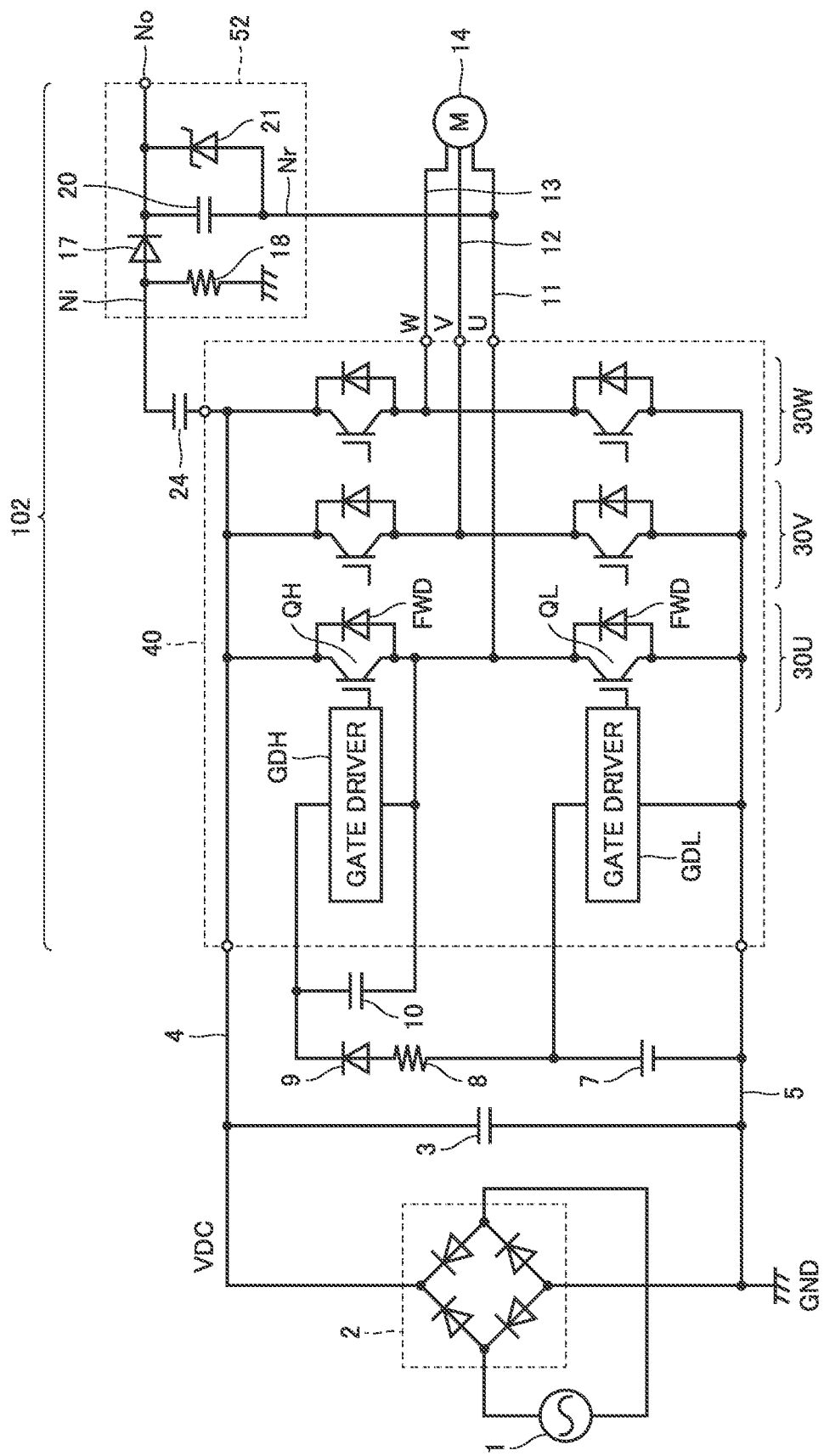
FIG. 3 is a circuit diagram illustrating an exemplary configuration of a semiconductor device according to a third embodiment.

FIG. 3 is a circuit diagram illustrating an exemplary configuration of a semiconductor device according to a third embodiment.

Referring to FIG. 3, a semiconductor device 102 according to the third embodiment includes power module 40 as in FIG. 1 and a self-generating power supply circuit 52.

Self-generating power supply circuit 52 includes diode 17, resistor 18, and capacitor 20 as in self-generating power supply circuits 50 and 51, and preferably further includes Zener diode 21. Since connection of diode 17, resistor 18, capacitor 20, and Zener diode 21 to input node Ni, output node No, and reference node Nr within self-generating power supply circuit 52 is similar to that in self-generating power supply circuits 50 and 51, detailed description will not be repeated.

Self-generating power supply circuit 52, on the other hand, is different from self-generating power supply circuits 50 and 51 in relation of connection to the outside. Specifically, input node Ni is connected to power supply line 4 (DC voltage VDC) with a capacitor 24 being interposed and reference node Nr is connected to one phase of lines 11 to 13 of three phases (the output terminals of three phases of power module 40). In the third embodiment, capacitor 24 corresponds to one embodiment of the "first capacitor."

Self-generating power supply circuit 52 according to the third embodiment with a circuit configuration as in self-generating power supply circuits 50 and 51 can self-generate floating power supply with a potential at the output terminal (the U-phase, the V-phase, or the W-phase) of power module 40 being defined as the reference. The power supply voltage at this time can be adjusted as appropriate, for example, within a range from several volts (V) to several ten volts (V). In mounting self-generating power supply circuit 52 on the DIPIPM™ described above, self-generating power supply circuit 52 can be used as an auxiliary power supply of a control power supply on the high side or as the control power supply itself.

In the third embodiment, self-generating power supply circuit 52 can be provided in, correspondence with an output terminal of any phase of power module 40, or can be provided for each of a plurality of phases.

Though an example where power module 40 contains six semiconductor switching elements that implement a three-phase inverter is described in the present embodiment, any configuration of power module 40 such as any number of semiconductor switching elements is applicable. In this case as well, with at least one output terminal where change in voltage occurs as a result of switching of connection relation with the power supply line in accordance with on and off of the semiconductor switching element, at least any one of self-generating power supply circuits 50 to 52 described in the present embodiment is applicable.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A semiconductor device comprising:
a power module in which at least one semiconductor switching element is contained; and
a self-generating power supply circuit connected to the power module, wherein
the power module includes at least one output terminal where a voltage change occurs at an on-off frequency of the semiconductor switching element, as a result of switching of connection relation with a power supply line for supply of a DC voltage, in accordance with on and off of the semiconductor switching element,
the self-generating power supply circuit includes
an input node connected to the output terminal or the power supply line via a first capacitor interposed between the output terminal and the input node, and to which the voltage change at the on-off frequency of the semiconductor switching element is transferred from the output terminal via the first capacitor such that a frequency of a voltage change of the input node is the same as the on-off frequency of the semiconductor switching element,
a diode connected in a predetermined connection direction between an output node and the input node,
a second capacitor connected between a reference node and the output node, and
a resistor connected between the input node and a ground line, and
the second capacitor holds a voltage across the reference node and the output node, in polarity in accordance with the connection direction of the diode.

2. The semiconductor device according to claim 1, wherein
the input node is connected to the output terminal,
the diode is arranged in a first connection direction in which the diode has an anode connected to the input node and a cathode connected to the output node, and
the reference node is connected to the ground line and a positive voltage is generated at the output node.

3. The semiconductor device according to claim 1, wherein
the input node is connected to the output terminal,
the diode is arranged in a second connection direction in which the diode has a cathode connected to the input node and an anode connected to the output node, and
the reference node is connected to the ground line and a negative voltage is generated at the output node.

4. The semiconductor device according to claim 2, wherein
the power module includes a plurality of output terminals of which connection relation with the power supply line is switched in accordance with on and off of respective different semiconductor switching elements, and
the input node is connected to the plurality of output terminals with different first capacitors being interposed, respectively.

5. The semiconductor device according to claim 3, wherein
the power module includes a plurality of output terminals of which connection relation with the power supply line is switched in accordance with on and off of respective different semiconductor switching elements, and the input node is connected to the plurality of output terminals with different first capacitors being interposed, respectively.

6. The semiconductor device according to claim 1, wherein
the reference node is connected to the output terminal, and
the input node is connected to the power supply line.

7. The semiconductor device according to claim 2, wherein
the self-generating power supply circuit further includes a Zener diode having an anode connected to the reference node and a cathode connected to the output node.

8. The semiconductor device according to claim 5, wherein
the self-generating power supply circuit further includes a Zener diode having an anode connected to the reference node and a cathode connected to the output node.

9. The semiconductor device according to claim 3, wherein
the self-generating power supply circuit further includes a Zener diode having an anode connected to the output node and a cathode connected to the reference node.

10. The semiconductor device according to claim 1, further comprising a second diode connected in parallel with the second capacitor.

11. The semiconductor device according to claim 1, further comprising a second diode connected between the reference node and the output node such that the second diode is connected in parallel with the second capacitor.

12. The semiconductor device according to claim 1, wherein the power module is a three-phase inverter.

13. A semiconductor device comprising:
a power module in which at least one semiconductor switching element is contained; and
a self-generating power supply circuit connected to the power module, wherein
the power module includes at least one output terminal where a voltage changes as a result of switching of connection relation with a power supply line for supply of a DC voltage, in accordance with on and off of the semiconductor switching element,
the self-generating power supply circuit includes
an input node connected to the output terminal or the power supply line via a first capacitor interposed between the output terminal or the power supply line and the input node,
a diode connected in a predetermined connection direction between an output node and the input node,
a second capacitor connected between a reference node and the output node, and
a resistor connected between the input node and a ground line, and
the second capacitor holds a voltage across the reference node and the output node, in polarity in accordance with the connection direction of the diode, wherein the input node is connected to the output terminal,
the diode is arranged in a second connection direction in which the diode has a cathode connected to the input node and an anode connected to the output node, and
the reference node is connected to the ground line and a negative voltage is generated at the output node.

14. The semiconductor device according to claim 13, wherein
the power module includes a plurality of output terminals of which connection relation with the power supply line is switched in accordance with on and off of respective different semiconductor switching elements, and
the input node is connected to the plurality of output terminals with different first capacitors being interposed, respectively.

15. The semiconductor device according to claim 14, wherein
the self-generating power supply circuit further includes a Zener diode having an anode connected to the reference node and a cathode connected to the output node.

16. The semiconductor device according to claim 13, wherein
the self-generating power supply circuit further includes a Zener diode having an anode connected to the output node and a cathode connected to the reference node.

17. A semiconductor device comprising:
a power module in which at least one semiconductor switching element is contained; and
a self-generating power supply circuit connected to the power module, wherein
the power module includes at least one output terminal where a voltage changes as a result of switching of connection relation with a power supply line for supply of a DC voltage, in accordance with on and off of the semiconductor switching element,
the self-generating power supply circuit includes
an input node connected to the output terminal or the power supply line via a first capacitor interposed between the output terminal or the power supply line and the input node,
a diode connected in a predetermined connection direction between an output node and the input node,
a second capacitor connected between a reference node and the output node, and
a resistor connected between the input node and a ground line, and
the second capacitor holds a voltage across the reference node and the output node, in polarity in accordance with the connection direction of the diode, wherein
the reference node is connected to the output terminal, and
the input node is connected to the power supply line.

* * * * *